(No Model.) 2 Sheets—Sheet 1.
H. W. GIPPLE.
GRAIN MEASURE.
No. 415,292. Patented Nov. 19, 1889.
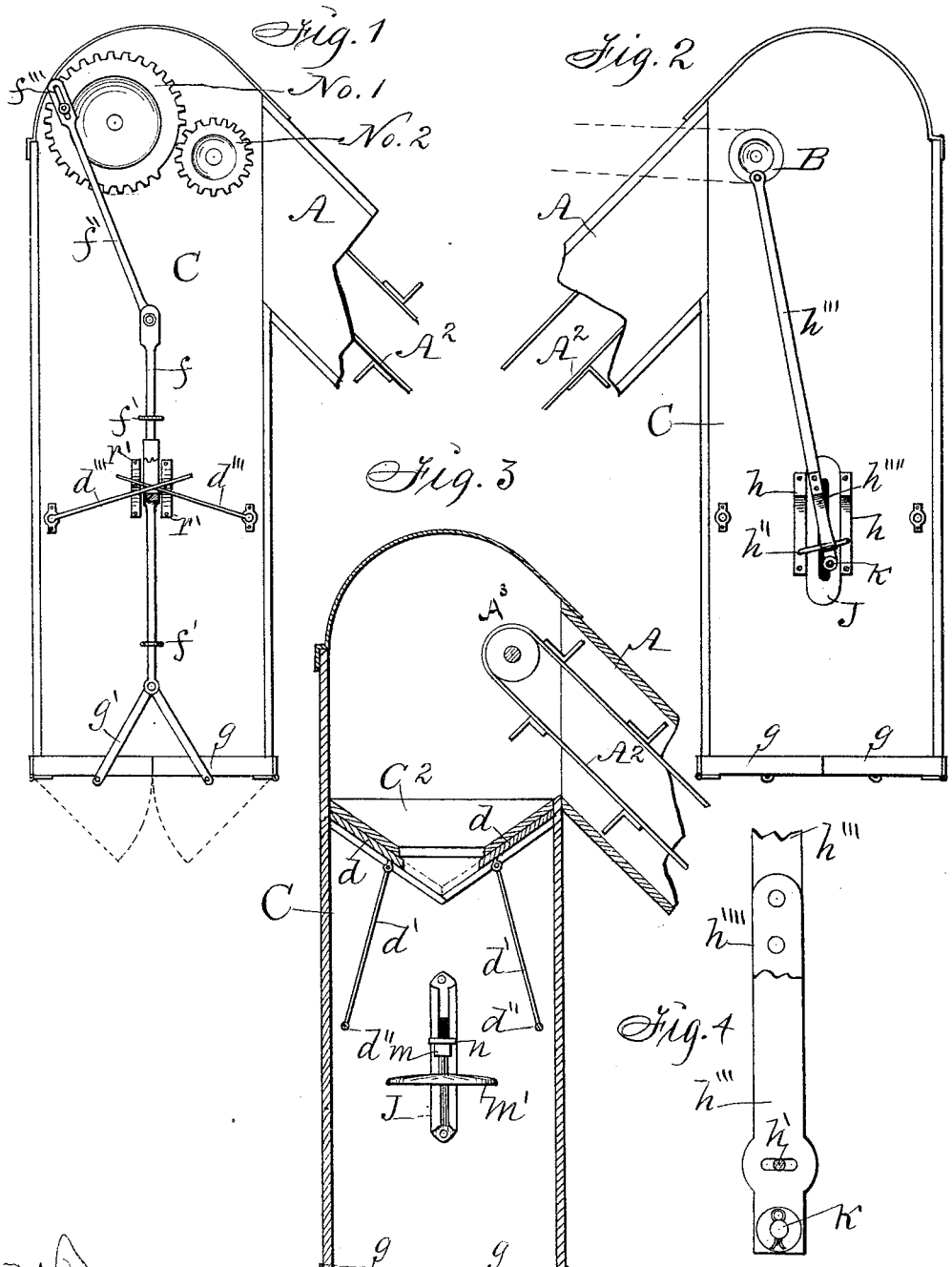
Witnesses:
R. H. Orwig.
M. P. Smith.
Inventor:
Harvey W. Gipple,
By Thomas G. Orwig, Atty.

(No Model.)  2 Sheets—Sheet 2.
H. W. GIPPLE.
GRAIN MEASURE.
No. 415,292. Patented Nov. 19, 1889.
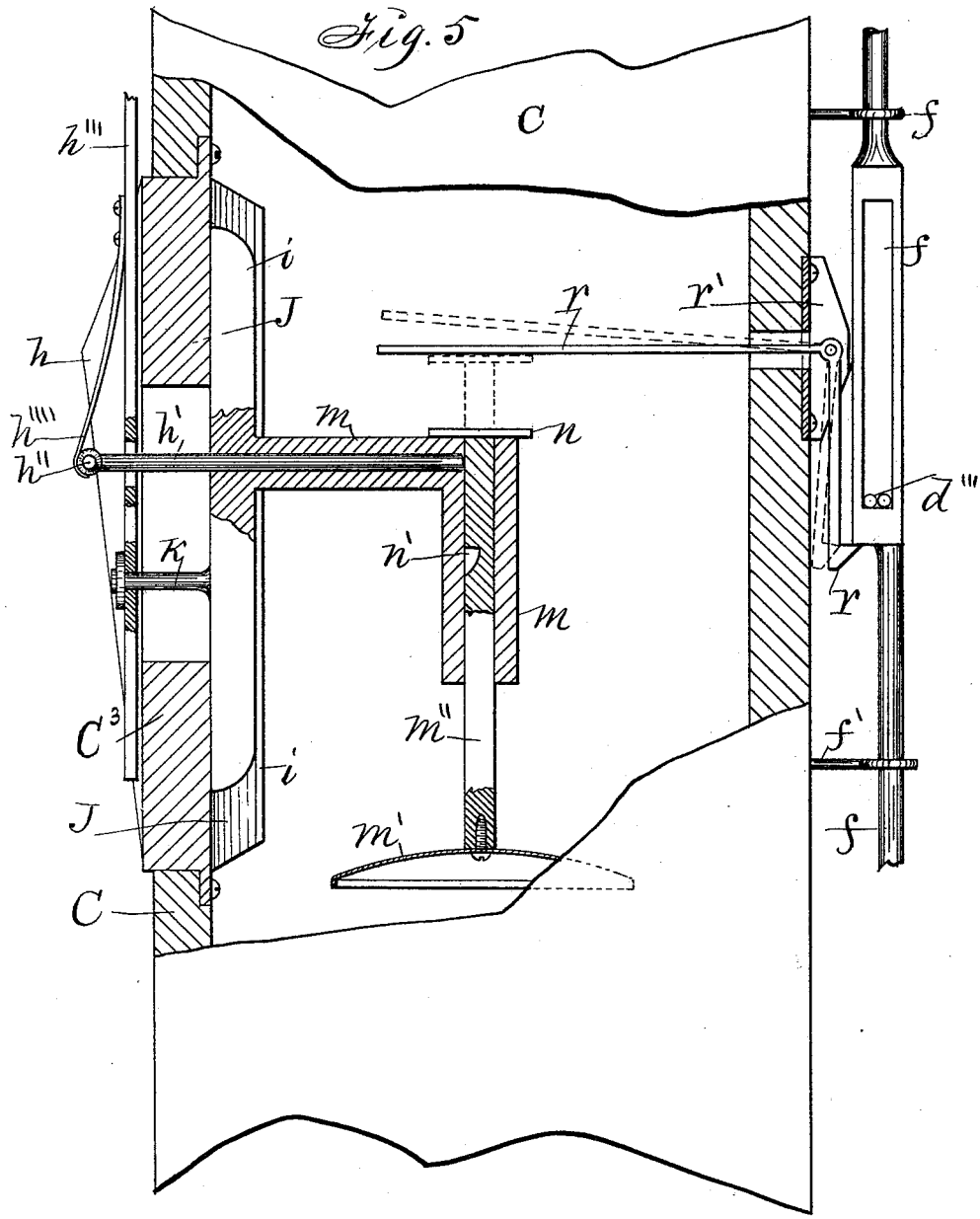
Witnesses:
R. H. Orwig.
M. P. Smith.
Inventor:
Harvey W. Gipple,
By Thomas G. Orwig, atty.
N. PETERS, Photo-Lithographer, Washington, D. C.

UNITED STATES PATENT OFFICE.

HARVEY W. GIPPLE, OF AUDUBON, IOWA, ASSIGNOR OF ONE-HALF TO W. H. JONES, OF SAME PLACE.

GRAIN-MEASURE.

SPECIFICATION forming part of Letters Patent No. 415,292, dated November 19, 1889.

Application filed July 29, 1889. Serial No. 319,118. (No model.)

*To all whom it may concern:*

Be it known that I, HARVEY W. GIPPLE, a citizen of the United States of America, residing at Audubon, in the county of Audubon and State of Iowa, have invented an Improved Automatic Grain-Measure, of which the following is a specification.

My object is to measure grain in bulk automatically as it is moved from a separator, or from one place to another by means of a conveyer; and my invention consists in the construction and combination of a measure and operative devices with a conveyer, as hereinafter set forth, pointed out in the claims, and illustrated in the accompanying drawings, in which—

Figure 1 is a side view of the measure, showing the mechanism attached on the outside for opening gates at the bottom. Fig. 2 is a view of the opposite side of the measure, showing a device for actuating the gate-opening mechanism. Fig. 3 is a vertical sectional view of the measure and a section of a conveyer. Fig. 4 is an enlarged detail view of part of the operative device shown in Fig. 2. Fig. 5 is an enlarged sectional view showing the gate-opening mechanism attached to the opposite sides of the measure and a trip device in an intermediate position.

A represents a conveyer-box, in which an endless carrier $A^2$ is operated in a common way, by means of a rotating cylinder or driving-pulley $A^3$, that has a belt-wheel B fixed to the end of its axle on the outside of the box, as shown in Fig. 2.

C is an open-ended measure fixed to the conveyer-box in such a manner that it will be in a perpendicular position.

$C^2$ is a hopper fixed in the top portion of the measure.

$d$ $d$ are mating sliding gates in bearings on the opposite sides of an opening in the center of the hopper.

$d'$ are frames made of metal rods hinged to the under sides of the gates and fixed to rock-shafts $d''$, that have their bearings on the sides of the measure C, as shown in Figs. 1 and 2.

$d'''$ are arms that project at right angles from the ends of the rock-shaft, and extend through a slot or bridle that forms a section of a reciprocating rod $f$, that has its bearings $f'$ fixed to the measure, as shown in Fig. 1.

No. 1 is a mutilated gear-wheel journaled to the outside of the top portion of the measure to engage a pinion, No. 2, on the end of the axle of the driving-pulley $A^3$ and belt-wheel B.

$f''$ is a pitman pivoted to the top end of the rod $f$ and connected with the wheel No. 1 by means of a wrist-pin and a bridle $f'''$, as shown in Fig. 1.

$g$ are gates hinged to the lower end of the measure C and connected with the rod $f$ by means of links $g'$, in such a manner that they will be simultaneously opened at each downward motion of the rod.

$C^3$ is a metal section of the side of the measure C, fitted and fixed in a corresponding opening. It has integral inclined planes or cams $h$ in parallel position on its outside and a slot between them, through which is extended a pin $h'$, that has a cross-head $h''$ on its outer end.

$h'''$ is a pitman connected with the belt-wheel B at its top end, and its lower end extends downward between the cams $h$ in such a manner that when the pin $h'$ is passed through a perforation in the pitman the cross-head $h''$ will engage both of the cams $h$, as shown in Fig. 2.

$h''''$ is a leaf-spring fixed to the pitman to engage the cross-head $h''$ and press the pin $h'$ inward.

$i$ $i$ are parallel bearings integral with the inside of the metal section $C^3$.

J is a slide fitted between them in such a manner that it can move up and down. It has a pin K projecting outward and fastened to the pitman $h'''$ in such a manner that the slide and pitman will move jointly.

$m$ is an elbow-shaped extension on the inside and central part of the slide J. It has a bore in its vertical portion that is intersected by a bore in its horizontal portion, through which the pin $h'$ is extended.

$m'$ is a foot in the form of a concavo-convex disk, fixed to the lower end of a leg $m''$, that extends through the vertical bore in the extension $m$.

$n$ is a plate or head fixed to the top of the leg, and $n'$ is a notch in the upper portion of the leg.

$r$ is an elbow-shaped latch pivoted to the side of the measure, by means of fixed bearings $r'$, in such a manner that a shoulder on the bottom of its vertical portion will engage a shoulder on the rod $f$, as shown in Fig. 5, and as required to retain the gates $g$ in the bottom of the measure closed until the latch is actuated by means of the foot $m'$ treading upon the grain in the measure and elevating the leg in its bearing until the notch $n'$ coincides with the horizontal bore that contains the pin $h'$ and allows the pin to enter the notch and to thereby lock the leg to the slide J, so that the slide will be lifted as required to bring the plate $n$ in contact with the latch $r$.

In the practical operation of my invention grain enters the measure as it falls from the endless carrier of the conveyer, and when the proper quantity has been admitted the gates $d$ will be automatically closed and the gates $g$ opened as required to empty the measure. The pitman $h'''$ is reciprocated by the rotary motion of the belt-wheel B, as required, to impart an up and down motion to the foot $m'$, and when the measure is nearly full the downward motions of the foot will be restricted by the grain upon which it treads and cause the leg $m''$ to rise until the plate $n$ at its top comes in contact with the horizontal part of the latch $r$, as required to trip the latch and free the rod $f$, so that the weight of the grain in the measure will pull it down as it presses the doors $g$ open and closes the gates $d$ by bearing down the arms $d'''$ of the rock-shafts $d''$, that extend through the slot in the rod $f$, and as the rod $f$ is thus pulled down while the measure is being emptied, it draws the wheel No. 1 into gear with the pinion and causes the wheel to make a complete revolution, and thereby reverses the motions of the doors $g$ and gates $d$ and the latching devices, to repeat the measuring and emptying operation as long as the conveyer is kept in motion and grain or other substances elevated thereby and dropped into the measure.

I claim as my invention—

1. In an automatic grain-measure, the combination of a mutilated gear-wheel with a pinion on the end of the axle of a driving-wheel or pulley located at the top portion of an open-ended measure, and two doors hinged to the bottom of the measure, a rod connected with the mutilated gear-wheel and the hinged doors to retain the doors elevated, a latch to support the rod, and a trip device to operate the latch and release the rod when the measure is full, for the purpose of automatically emptying the measure.

2. The mutilated gear-wheel No. 1, the pinion No. 2, the rod $f$, having a shoulder at its central portion, the pitman $f''$, having a bridle $f''''$ at its top end, the doors $g$, links $g'$, and the latch $r$, arranged and combined with an open-ended measure, substantially as shown and described, for the purposes stated.

3. The slide J, having an extension $m$, the foot $m'$, carried by the leg $m''$, having a fixed plate $n$ and notch $n'$, the pin $h'$, having a cross-head $h''$, the rod $h'''$, carrying the spring $h''''$ and connected with the slide J by means of a pin K, in combination with the section $C^3$, having cams $h$ and bearings $i$, and a grain-measure for the purpose of operating a trip or latch device, in the manner set forth, and for the purposes stated.

4. The hopper $C^2$, the sliding gates $d$, the frames $d'$, rock-shafts $d''$, having arms $d'''$, and the reciprocating rod $f$, having a bridle or slot to admit the ends of the arms, arranged and combined with an open-ended grain-measure, substantially as shown and described, for the purposes stated.

5. An improved automatic grain-measure, comprising a box C, having a fixed hopper $C^2$, gates $d$, frames $d'$, rock-shafts $d''$, having arms $d'''$, wheels Nos. 1 and 2, a rod $f$ and pitman $f''$, doors $g$ at the bottom of the box, a metal section $C^3$, having cams $h$ and bearings $i$, a slide J, having an extension $m$, a foot $m'$, leg $m''$, having top plate $n$ and notch $n'$, a pin $h'$, having cross-head $h''$, a rod $h'''$, connected with the wheel B at its top and with the slide J at its bottom, a spring $h''''$, and a latch $r$, arranged and combined substantially as shown and described.

HARVEY W. GIPPLE.

Witnesses:
H. W. WILSON,
T. D. PARSONS.